May 3, 1938.  A. ZACHARIASSEN ET AL  2,116,296
APPARATUS FOR MEASURING OR DELIVERING LIQUIDS OR GASES
Filed Sept. 17, 1934  3 Sheets-Sheet 1
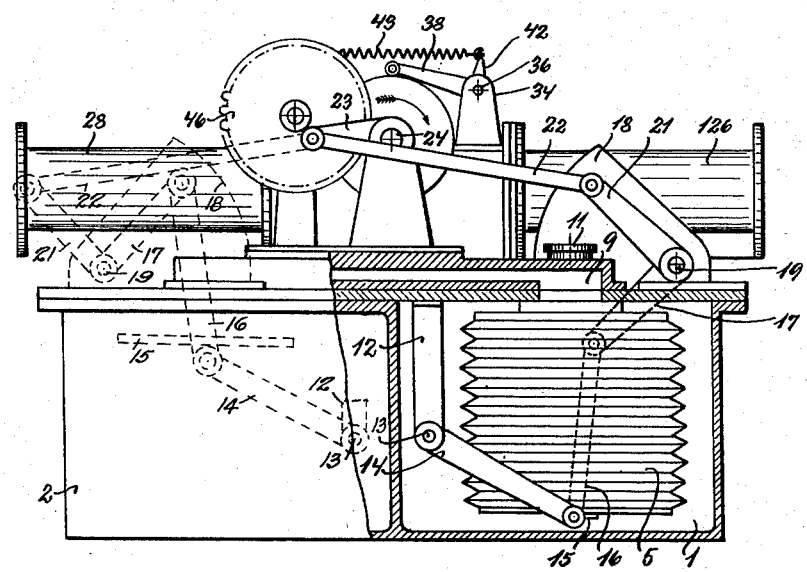
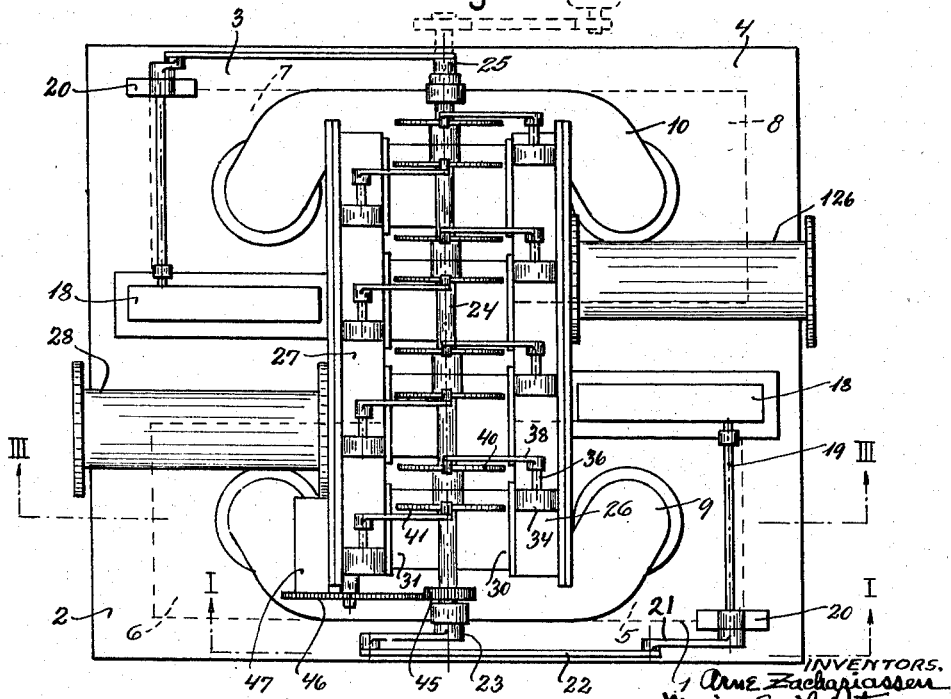

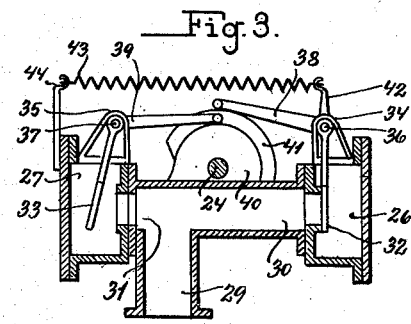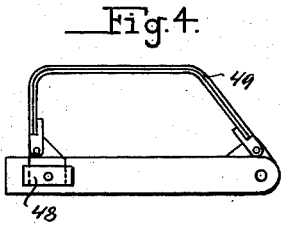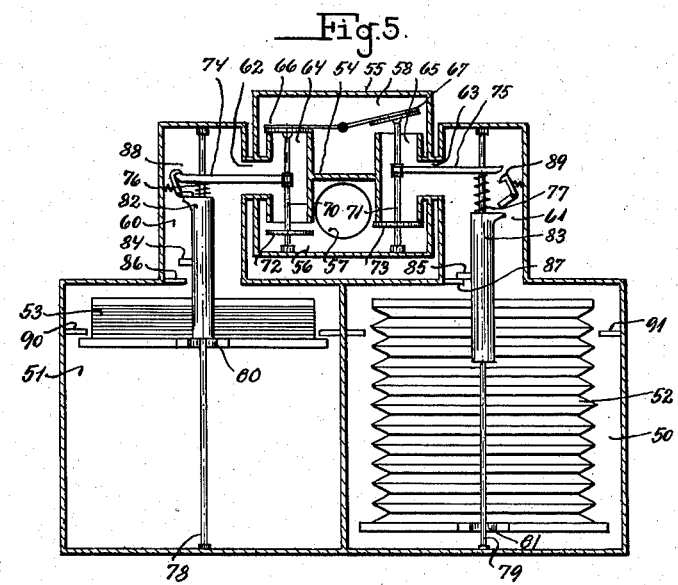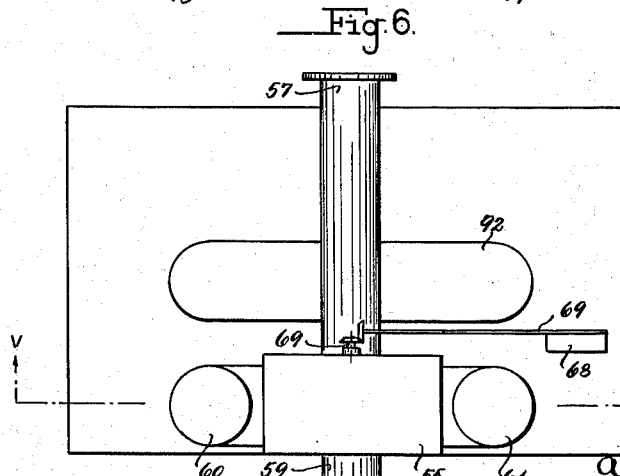

May 3, 1938.   A. ZACHARIASSEN ET AL   2,116,296
APPARATUS FOR MEASURING OR DELIVERING LIQUIDS OR GASES
Filed Sept. 17, 1934   3 Sheets-Sheet 3
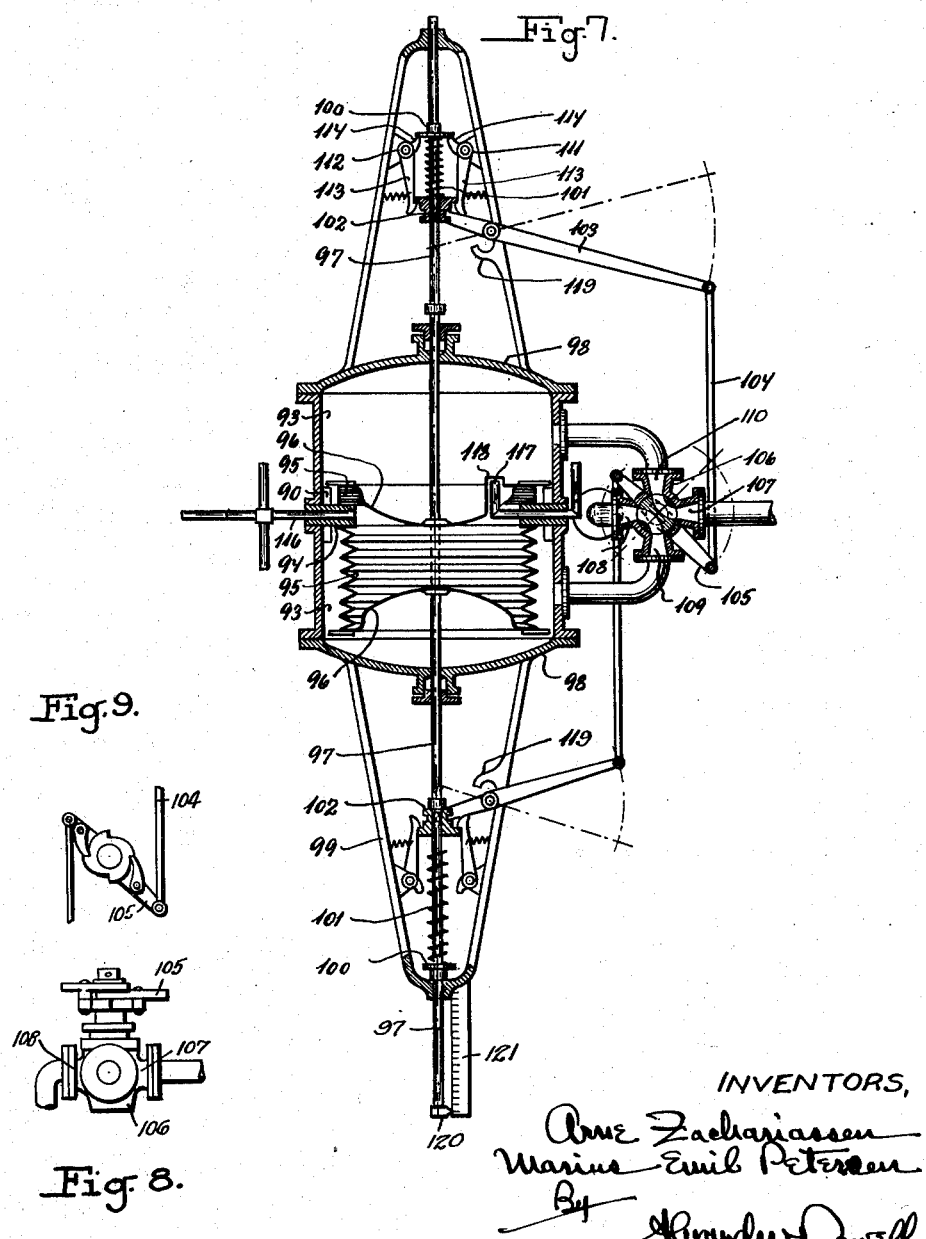

UNITED STATES PATENT OFFICE 2,116,296

APPARATUS FOR MEASURING OR DELIVERING LIQUIDS OR GASES

Arne Zachariassen and Marius Emil Petersen, Copenhagen, Denmark

Application September 17, 1934, Serial No. 744,414 In Denmark September 18, 1933

16 Claims. (Cl. 73—263)

The present invention relates to an apparatus for measuring fluids, one object of the invention being to provide such an apparatus which is adapted to measure a fluid with a relatively great exactitude and with small losses of energy, and is especially but not exclusively adapted for continuously measuring a liquid such as any sort of oil which is being delivered, for instance, from one tank to another.

To this end, the invention provides for an apparatus for measuring fluids comprising one or more pairs of fixed chambers for the fluid to be measured; a closed working liquid chamber containing a working liquid having sections operatively interposed within each pair of fixed chambers and having certain walls in common with both of the fixed chambers including displaceable wall portions; the walls of the working liquid chamber not in common with the fixed chambers enclosing between them a direct intercommunication of constant volume between the sections; valve means for connecting each of the fixed chambers alternately with a supply or discharge for the fluid to be measured; the fluid admitted to a fixed chamber during the filling operation displacing the displaceable wall portions of the related working chamber section and thereby transferring the working liquid in said section through the intercommunication causing a corresponding displacement of the displaceable wall portions of the other section of the pair; means for reversing the position of all valve means when a suitable quantity of working liquid has been displaced by the fluid flowing into one chamber of a pair, and has subsequently displaced a corresponding quantity of fluid from the other chamber of the pair.

The displaceable wall members may suitably be in the form of bellows or the like, each arranged in one of the chambers for the fluid to be measured, and being connected in pairs either directly or through suitable channels or conduits, the interiors of each pair of bellows together with the channel or conduit connecting same forming a chamber filled with working liquid.

The function of the apparatus according to the invention can briefly be described as follows:

One of a pair of chambers for the fluid to be measured, between which is operatively disposed a chamber with displaceable wall members filled with working liquid, is connected to the inlet of the apparatus, while the other chamber belonging to the same pair is connected to the outlet, and the displaceable wall members are displaced under the action of the pressure of the fluid to be measured, although if desired extraneous means may be utilized to assist with displacement of the displaceable wall members by utilizing a suitable source of mechanical power. In any event, the displaceable wall members will be displaced as a whole, so that the working liquid penetrates from the inner space of one of the chambers for the fluid to be measured to the inner space of the other chamber, thereby displacing fluid from the last named chamber while a corresponding quantity of fluid flows into the first named chamber. Preferably the construction and disposition of the displaceable wall members is such that substantially the whole quantity of working liquid passes from one chamber for the fluid to the other in each stroke, the exactitude of the measurement thus depending substantially on the constancy of the working liquid.

This action can be further supported by an arrangement in which the position of the valves, controlling the flow of the fluid to be measured to and from the different chambers for such fluid, is changed at the exact moment when the working fluid has passed as far as possible from the inner space of one fluid chamber to the inner space of another such chamber. This is obtained by providing power releasing means adapted to release in one end position of each displaceable wall member a force for reversing the position of all valves or like means for controlling the supply to and discharge from the fixed chambers cooperating with the respective displaceable wall member. Thus in the case of a displaceable wall member in the form of a bellows the end position of the same in which the power releasing means is adapted to act will be the entirely compressed position of the bellows.

It is to be understood that it is an important feature of the invention that displaceable wall members are provided for separating the working liquid from the liquid to be measured, so that the possibility of any mixing or mutual diffusion of the two fluids is obviated, and there cannot occur any undue adhesion of the working liquid to the walls of the chambers for the fluid to be measured such as would be the case if the displaceable wall members were dispensed with.

It is also an important feature of the invention that the measurement may be reduced to a certain predetermined temperature simply by using a working liquid having the same or substantially the same coefficient of thermal expansion as the fluid to be measured. For instance the working liquid may be of the same sort as the fluid to be measured.

But in order that the invention may be more clearly understood reference will now be made to the accompanying drawings, in which:—

Fig. 1 shows a construction of an apparatus according to the invention, in side elevation and, as far as the lower part is concerned, partly in section along the line I—I in Fig. 2, Fig. 2 the same apparatus in top view, Fig. 3 certain details of the same apparatus, viewed in section along the line III—III in Fig. 2, Fig. 4 a special construction of a detail of the apparatus shown in Figs. 1–3, Fig. 5 diagramatically, another construction of an apparatus according to the invention, in section along the line V—V in Fig. 6, Fig. 6 the same apparatus, in top view, and Fig. 7, in longitudinal section, a third construction of an apparatus according to the invention.

Fig. 8 is an elevation of the cock in Fig. 7, illustrating one form of ratchet mechanism therefor.

Fig. 9 is a top plan view of the ratchet mechanism.

The apparatus shown in Figs. 1–3 consists of four box-shaped containers 1, 2, 3 and 4, built together so as to form a unit, a bellows 5, 6, 7 and 8, respectively, being provided in each of the said containers, and the bellows 5 being shown in Fig. 1. The bellows are interconnected in pairs by suitable connecting pipes, which on the apparatus shown on the drawing are constructed, on account of the restricted space, as flat channels 9 and 10 interconnecting the bellows 5 and 6, and, respectively, 7 and 8. Into the bellows and the pipes interconnecting the same, there is filled, by way of an ordinarily closed filling opening 11, a quantity of liquid of the same kind as the one to be delivered (or of another kind), the said quantity being just sufficient to fill the entire space formed by the interior of the bellows and the connecting channels, when one of the bellows is in its top position and the other one in its bottom position.

At each end of the chamber 1 a bearing post 12 is provided. In these posts a shaft 13 is journalled, which carries an arm 14 on either side of the bellows 5. The arms 14 are pivotally connected to the bottom 15 of the bellows 5 and, see Fig. 1, to a lever 16 (shown by dotted lines) behind the said bellows which lever 16 is, in its turn, connected pivotally to an arm 17 on a shaft 19 journalled in a casing 18 communicating with the interior of the container 1, the said shaft 19 passing in a liquid-tight manner through the wall of the casing 18 and supporting, at its other end which is supported by a bearing 20, an arm 21 which by means of a connecting rod 22 is connected to a crank pin 23 on a shaft 24, which in the following is referred to as the main shaft.

To the bellows 7 there is connected a system of levers and arms corresponding exactly to the one described above, with the sole exception that this system is connected to a crank pin 25 provided at the other end of the main shaft and phase-displaced through 90° relatively to the crank pin 23. The bellows 6 and 8, on the contrary, do not have to be connected to the main shaft, but if a still better guiding and a more reliable operation of the apparatus be desired, there is nothing to prevent these bellows from being similarly connected to the crank pins 23 and 25, respectively, as indicated in dotted lines at the left hand side of Fig. 1.

The supply to the tanks 1, 2, 3 and 4 of the fluid to be delivered or measured is effected by way of a supply pipe 126 which is connected to a box 26 running parallel to and on one side of the main shaft 24, and the discharge is effected by way of a discharge pipe 28 from a corresponding box 27 provided on the other side of the main shaft.

Between the boxes 26 and 27, four T-shaped pipes 29 (see Fig. 3) are disposed, the stem of each of the said pipes being connected to one of the tanks 1, 2, 3 and 4, and the branches 30 and 31 of each of the said pipes being connected to the boxes 26 and 27 respectively. At the orifice of each of the branches 30 and 31, a flap valve 32 and 33, respectively, is provided, and each of these valves is connected to a shaft 36 or 37, respectively, journalled in and passing through a vertically projecting casing 34 or 35, respectively, and fitted outside of the casing with an arm 38 or 39, respectively, which by means of a tappet, roller or the like rests against a guide or cam disc 41 or 40, respectively, attached to the main shaft. The circumference of each of the discs 41 and 40 consists substantially of two semi-circles with different diameters so that each cam disc will during one half of its revolution close the flap valve cooperating with the same by lifting the arm 38 or 39, and during the next half revolution of the shaft 24 allow the flap valve to be opened under the influence of a spring 43 having one end connected to a fixed arm 44 projecting upward from the box 27 and the other end connected to an arm 42 attached to the shaft 36. The relative arrangement of the cams 41 and 40 will be easily understood from the explanation given below of the function of the apparatus, where it is stated which flap valves will have to be opened and which will have to be closed during the different strokes of the apparatus. On the shaft 36 there is further attached an arm 42, which by means of a spring 43 is connected to a fixed arm 44 projecting upward from the box 27. The shaft 37 is actuated by a corresponding spring, which for the sake of clearness, is, however, omitted in Fig. 3.

At one end of the main shaft 24, a gear wheel 45 is attached thereto, which by means of another gear wheel 46 in a suitable, not further detailed, manner serves to drive a counting device 47.

The apparatus acts in the following manner:

At a certain moment, the bellows 5 will be standing in the lowermost position and the bellows 6 consequently in its uppermost position, at the same time as the flap valve 32 supplying liquid to the chamber 1 is in its open position, the discharging flap valve 33, belonging to the same chamber, in its closing position, the supplying flap valve 32 belonging to the chamber 2 in its closing position, and the discharging flap valve 33 belonging to the same chamber in its open position.

Fluid will consequently flow into the tank 1, and this fluid will compress the bellows 5, so that the measuring liquid will be pressed out from this bellows and into the bellows 6, which thereby expands and presses a corresponding quantity of fluid out through the discharge pipe 28. During its upward motion the bellows 5 transmits, by way of the system of rods and levers 16, 17, 21, 22 and the crank pin 23, a rotary motion to the main shaft 24. When the bellows 5 reaches its top position, all the supplying and discharging flap valves 32 and 33 belonging to the chambers 1 and 2 will be reversed by the action of the cam discs 41 and 40, and the two bellows commence therefore a new period of operation similar to the preceding one.

As mentioned before, the crank pin 25 is phase-displaced by 90° relatively to the crank pin 23, and thereby the advantages are attained that the two sets of bellows will always be one half cycle phase-displaced relatively to one another, in such a manner that the bellows 5 will act on the main shaft 24 with its maximum torque when the bellows 7 is at its dead-centre position, and vice versa.

The apparatus described is especially distinguished in that it gives a delivery or a measurement very free of losses. Any surfaces sliding against one another in liquid-tight manner in the chambers in which the liquid to be delivered is passing, are avoided entirely, and thereby the friction is reduced to a minimum. It will be seen in the drawing that from the spaces formed by the interior of the bellows and the channels between the same there are no members at all extending out, and that from the interior of the tanks 1, 2, 3 and 4, themselves, there is merely one opening for each of the shafts 19.

From the boxes 26 and 27, there is, besides, an opening for each of the shafts 36 and 37. In all these openings, however, the member passing through is a thin shaft, which only has to perform a rotary (and thus not sliding) motion in the corresponding bushing, and the passage of the shafts will therefore neither give any appreciable friction, nor offer any appreciable risk of leakage.

Owing to the fact that the friction is only slight, the apparatus may be driven by the liquid itself that has to be delivered, even where only a rather small pressure head is available. The apparatus is especially intended to be used in this manner. However, if the head available for the liquid to be delivered is too small, there is nothing to prevent the shaft 24 from being coupled to a separate driving mechanism of any kind whatever such as a motor M as indicated in dotted lines Fig. 2.

The motor M preferably furnishes sufficient torque to drive the shaft 24 at a rate of speed which corresponds with the normal rate of flow of the liquid through the tanks 1—4 as above described and is so constructed that the bellows may operate irrespective of the driving force of or on the liquid being metered. The motor M may be of the fluid type shown and described in U. S. Letters Patent No. 1,797,233 dated March 24, 1931, and such construction being well-known needs no further description herein.

As appearing from Fig. 4, a variation in the stroke of the bellows can be obtained by fitting each of the arms 14 with a longitudinally sliding block 48 actuated by a bimetallic thermo-loop 49, which is instead of the arm 14 itself, connected to the shaft 13. As understood directly, this arrangement will cause the bellows stroke to vary with the temperature, and by suitable dimensioning the thermo-loop 49, the result can be attained that the stroke of bellows will vary in proportion to the thermal expansion of the fluid to be delivered, so that the measuring will be by volume, reduced to a certain definite temperature. The loop 49 will vary the stroke of the bellows for the reason that lever 16 is substantially perpendicular to lever 14 in its lowermost position shown in full lines at the right hand side of Fig. 1, as well as in the uppermost position of this lever as shown in dotted lines at the left-hand side of Fig. 1, and the variation of the length of lever 14 will have a very little influence on the angular movement of lever 14. Since, however, the angular movement of lever 14 remains substantially constant the linear movement of the free end of lever 14 will undergo a variation substantially proportional to the length of lever 14. Now the stroke of the bellows is determined by the linear movement of the free end of lever 14 and accordingly varies with the length of lever 14 which length in turn depends upon the temperature, being varied in accordance with the same by loop 49.

The arrangement of the thermo-loop 49 may suitably be combined with the feature mentioned in the following that the measuring liquid used is a liquid with the same, or approximately the same, coefficient of thermal expansion as the liquid to be delivered.

The invention comprises also delivering or measuring apparatuses by which solely the constancy and thermal expansion of the measuring liquid are used for securing an accurate measurement reduced to a certain temperature. In such apparatus the entire quantity of measuring liquid (disregarding the constant and relatively small dead space formed by the connecting duct between the bellows) is transferred from one of the bellows when reaching its entirely collapsed position, to the other bellows of the pair, and the means for effecting a reversal of all the valves belonging to the set of bellows concerned is also actuated at the same moment.

The constancy of the measuring liquid, which suitably is secured by avoiding any outlets from the chamber containing the measuring liquid, will here guarantee the accuracy of the measuring, and if use is made of a measuring liquid having the same or approximately the same, coefficient of expansion as the fluid to be measured, then this feature, as understood directly, will effect an automatic temperature compensation. If the clearance or dead space is considerable, a theoretically correct temperature compensation is attained by selecting the measuring liquid in such a manner that the ratio between the thermal coefficients of expansion of the measuring liquid and, respectively, the fluid to be measured is equal, or nearly equal, to the ratio of the total volume of measuring liquid less the dead space to the total volume of the measuring liquid.

Apparatuses according to this principle are shown in Figs. 5–7.

The apparatus shown diagrammatically in Figs. 5 and 6 consists of two tanks 50 and 51 built together so as to form a unit, a bellows 52, respectively 53, being provided in each of the said tanks. On top of the tanks 50 and 51, there is provided a box 55 divided by means of a horizontal partition 54 into two compartments, the lower of which 56 communicates with the supply pipe 57 for the fluid to be delivered or measured, while the upper compartment 58 communicates with the discharge pipe 59. The tanks 50 and 51 communicate with the box 55 by way of vertical pipes 60 and 61 and horizontal pipes 62 and 63 connected thereto, the last mentioned pipes entering some distance into the box 55 and being each fitted with a transverse piece of pipe 64 and 65, respectively, having at each end a seat for a suitable valve, two such seats being thus disposed in each compartment 56 and 58.

The flap valves 66 and 67 provided at the top ends of the pieces of pipe 64 and 65 are connected to a two-armed lever, which is attached to a shaft 69 passing out through the box 55 and serving there, in a manner not further detailed, to drive a counting device 68. Each of the valves 66 and 67 are pivotally connected to rods 70 and 71 respectively which rods are suitably guided at the bottom of the box, said rods being also connected to the corresponding poppet valve 72, respectively 73, provided at the other end of each piece of pipe. The rod 70, respectively 71, is connected to an arm 74, respectively 75, extending through the pipe 62, respectively 63, into the pipe 60, respectively 61, the said arms being actuated by a spring 76, respectively 77, which are tightened during the upward motion of the bellows concerned in the following manner: a projection 80, respectively 81, on the bellows bottom, which projection is fitted with a hole for a guide rod 78, respectively 79, provided in the tank and passing up into the pipe 60, respectively 61, takes after a certain travel a pipe 82, respectively 83, encircling the guide rod 78, respectively 79, which pipe, up to this moment, has rested by means of a pin 84, respectively 85, against a casing projection 86, respectively 87, along with it and thereby tightens the spring 76, respectively 77.

In the duct 60, respectively 61, a pawl 88, respectively 89, is provided which is adapted to engage and maintain in position the arm 74, respectively 75, and the lower end of which projects into the path of the pipe 82, respectively 83. For fixation of the collapsed position of the bellows, stops 90, respectively 91, may suitably be provided for the bellows bottom. The bellows are interconnected by means of a duct 92.

Fig. 5 shows the apparatus in the position which it occupies immediately before the bellows 53 reaches its upper position. The spring 76 is tightened, and is consequently ready to press the arm 74 upward and, thereby, to reverse all the valves. This, however, is prevented provisionally by the spring pressed pawl 88, and will therefore not be done until the moment when the pawl is released by the top end of the pipe 82 striking the same. The length of the pipe 82 is determined in such a manner that this will happen at the same time as the side of the bellows bottom that supports the projection 80 strikes the corresponding fixing stop. Owing to the downward pressure of the spring 76 on the bellows bottom, it must be assumed that this side of the bellows bottom will be behind during the last part of the bellows stroke and, consequently, the bellows will be perfectly collapsed at the moment when the valves are being reversed. After this a new stroke of bellows commences, which is performed in exactly the same manner as the one described.

The apparatus according to the invention shown in Fig. 7 consists of two tanks 93 disposed in line with one another, to the perforated partition 94 of which two bellows 95 with dome-shaped bottoms 96 are attached, so as to project each into the corresponding one of the tanks 93. To the centre of each of these bottoms a rod 97 is attached, which passes in liquid-tight manner through the bottom 98 of each tank 93 concerned, and, outside thereof, is guided by a suitable frame 99. Each of the rods 97 supports a fixed flange 100, against which a spring 101 is resting, which spring at its other end presses against a sleeve 102 adapted to slide along the rod 97.

By way of a lever 103 pivoted in the upper frame 99 and a rod 104, the upper sleeve 102 is connected to the ratchet arm 105 of a ratchet mechanism shown in Fig. 9, which serves to rotate a four-way cock 106, one pair of opposite sockets 107 and 108 of which are connected to the supply and discharge pipe respectively for the fluid to be delivered or measured, while the other pair of opposite sockets 109 and 110 are connected each to one of the tanks 93.

Since rods 103, 104 and 105 associated with the upper bellows (Fig. 7) must be able to operate independently of the corresponding rods associated with the lower bellows, two arms 105 are provided, movable independently of each other.

In each of the frames 99 a pair of weighted or spring pressed snatch hooks 111 and 112 are further pivoted, the said hooks having on the one hand arms 113 adapted to engage the sleeve 102 and, thereby, to maintain the same in position, and on the other hand arms 114 projecting into the path described by the fixed flange 100 during the bellows stroke. To the rod 97 another fixed flange 115 is attached, which serves to take the sleeve 102 along, during the motion of the rod 97 in the one direction and, besides, to limit the bellows stroke. This limitation may, if desired, be effected by means of stops in the same manner as in the apparatus shown in Figs. 5 and 6. In the latter case, for instance the upper rod 97 will not reach its bottom position until the bellows bottom rests with its entire periphery against the said stops, and when the rod 97 occupies its bottom position this will, therefore, be a good criterion indicating that the corresponding bellows is in its perfectly collapsed state.

The apparatus acts in the following manner. During the downward motion of the bellows, the flange 100 on the upper rod will first compress the spring 101, until the upper bellows comes into the position shown in the Figure, which is very nearly the lowest position. During the further travel of the bellows, the flange 100 will release the sleeve 102 held by means of the snatch hooks 111, and the spring 101 will then push this sleeve down along the rod 97, and thereby the four-way cock 106 will be turned a quarter of a revolution by means of the rods 103, 104 and 105.

The two bellows change now their direction of motion, and the procedure described is repeated, with the only exception that the function of the two bellows are now interchanged.

In order to make sure that the four-way cock shall be rotated through exactly 90°, the frame 99 may suitably be fitted with stops 119 serving to limit the rotation of each of the rods 103 in one direction, viz., the active direction.

The filling with measuring liquid is effected by way of a pipe 116 entering through the partition 94 between the tanks 93 and into the space formed between the bellows, and at the same time the air can escape from the said space by way of a pipe 117, the orifice of which is situated at an artificially produced highest point 118 of the said space. Appropriate valves are provided in the pipes 116 and 117 so that these pipes may be closed after the predetermined quantity of working fluid has entered the space within the bellows.

As shown the bottoms of the bellows may be rigidly interconnected. Thermal expansion and contractions of the measuring liquid will then cause the bellow surfaces to bulge outward more or less, according to the circumstances.

Temperature changes may be compensated for by using a liquid inside of the bellows which liquid has the same coefficient of cubical expansion as that of the fluid being metered. It is true that the variations in the volume of the measuring liquid due to temperature changes will vary the size of the bellows 95. However, the size of a bellows cannot be varied in its entirely compressed position. Accordingly only the bellows which for the moment is expanded will be influenced by the variations of volume of the measuring liquid, whence a greater volume of measuring liquid will flow from one bellows to the other in each stroke. It is immaterial whether this is obtained by a prolongation of the stroke of the bellows or by a lateral expansion of the same. When the whole volume of measuring liquid passes in each stroke from one bellows to the other and this volume varies in accordance with the temperature the volume of the liquid to be measured displaced in each stroke will vary accordingly with the temperature.

The counting device belonging to the apparatus may suitably be coupled to the same shaft as the four-way cock 106. In this manner only full bellows strokes will be counted, but this will as a rule be fully sufficient. If it be desired also to measure fractions of a bellows stroke, a pointer 120 may for instance be attached to one of the rods 97, which pointer moves in front of a graduate scale 121, on which a reading may consequently be made of the quantity of fluid delivered after the last full bellows stroke, which quantity then merely has to be added to the one registered by the counting device.

Obviously the invention is not limited to the constructions shown, but may be varied in several manners.

Having now particularly described and ascertained the nature of our invention and in what manner the same is to be performed we declare that what we claim is:—

1. An apparatus for measuring fluids comprising fixed chambers, means for alternately filling the chambers with and emptying the same of a fluid to be measured; displaceable wall chambers within each of the fixed chambers; said displaceable wall chambers being inter-communicating and containing a working liquid, and adapted to be alternately displaced by the filling and emptying of their related fixed chambers; the working liquid from a displaced displaceable wall chamber passing into a communicating displaceable wall chamber; and means operated by the displaceable wall chambers for indicating the amount of the fluid passing through the fixed chambers; the working liquid having substantially the same coefficient of thermal expansion as the fluid to be measured.

2. An apparatus for measuring fluids comprising fixed chambers, means for alternately filling the chambers with and emptying the same of a fluid to be measured; displaceable wall chambers within each of the fixed chambers; said displaceable wall chambers being inter-communicating and containing a working liquid, and adapted to be alternately displaced by the filling and emptying of their related fixed chambers; the working liquid from a displaced displaceable wall chamber passing into a communicating displaceable wall chamber; and means operated by the displaceable wall chambers for indicating the amount of the fluid passing through the fixed chambers; said inter-communicating displaceable wall chambers being connected in pairs by ducts, and the ratios between the coefficients of thermal expansion of the working liquid to the fluid to be measured being substantially equal to the ratios between the total volume of working liquid less the dead volume contained in the inter-communications to the total volume of working liquid.

3. An apparatus for measuring fluids comprising fixed chambers, a supply pipe; a discharge pipe; valve means for alternately connecting the fixed chambers with the supply and discharge pipes to alternately fill the chambers with and empty the same of a fluid to be measured; displaceable wall chambers within each of the fixed chambers; said displaceable wall chambers being inter-communicating and containing a working liquid, and adapted to be alternately collapsed by the filling and emptying of their related fixed chambers; the working liquid from a collapsed displaceable wall chamber being passed into a communicating displaceable wall chamber; a shaft operated by the displaceable walls and operating said valve means, and a counting mechanism operated by the shaft; temperature responsive means for varying in accordance with the temperature of the fluid to be measured the relation between the movement of the displaceable walls and the corresponding angular movement of the shaft.

4. An apparatus for measuring fluids comprising fixed chambers, a supply pipe; a discharge pipe; valve means for alternately connecting the fixed chambers with the supply and discharge pipes to alternately fill the chambers with and empty the same of a fluid to be measured; displaceable wall chambers within each of the fixed chambers; said displaceable wall chambers being intercommunicating and containing a working liquid, and adapted to be alternately collapsed by the filling and emptying of their related fixed chambers; the working liquid from a collapsed displaceable wall chamber being passed into a communicating displaceable wall chamber; a shaft operated by the displaceable walls and operating said valve means, and a counting mechanism operated by the shaft; the working liquid having substantially the same coefficient of thermal expansion as the fluid to be measured.

5. An apparatus for measuring fluids comprising fixed chambers, a supply pipe; a discharge pipe; valve means for alternately connecting the fixed chambers with the supply and discharge pipes to alternately fill the chambers with and empty the same of a fluid to be measured; displaceable wall chambers within each of the fixed chambers; said displaceable wall chambers being intercommunicating and containing a working liquid, and adapted to be alternately collapsed by the filling and emptying of their related fixed chambers; the working liquid from a collapsed displaceable wall chamber being passed into a communicating displaceable wall chamber; a shaft operated by the displaceable walls and operating said valve means, and a counting mechanism operated by the shaft; said inter-communicating displaceable wall chambers being connected in pairs by ducts, and the ratios between the coefficients of thermal expansion of the working liquid to the fluid to be measured being substantially equal to the ratios between the total volume of working liquid less the dead volume contained in the intercommunications to the total value of working liquid.

6. An apparatus for measuring fluids comprising a pair of fixed chambers for the fluid to be measured, a bellows arranged in each of such chambers, the bellows being connected so as to form chambers with displaceable wall members and filled with a working liquid, a four-way cock belonging to the pair of fixed chambers and adapted to connect such chambers alternately to the supply and discharge of the apparatus, a ratchet mechanism for actuating the four-way cock, and releasing means adapted to release in the entirely compressed position of each bellows a force for actuating the ratchet mechanism.

7. An apparatus for measuring fluids comprising two fixed chambers for the liquid to be measured placed end to end and separated by a partition with an aperture; two bellows attached to the edge of the aperture and each projecting into one of the two chambers, the space between the two bellows forming a chamber with displaceable wall members and filled with a working liquid.

8. An apparatus for measuring fluids comprising a pair of fixed chambers for the fluid to be measured; a closed working liquid chamber containing a working liquid having sections operatively interposed within each of the fixed chambers and having certain walls in common with both of the fixed chambers including displaceable wall portions; the walls of the working liquid chamber not in common with the fixed chambers enclosing between them a direct intercommunication of constant volume between the sections; valve means for connecting each of the fixed chambers alternately with a supply and discharge for the fluid to be measured; the fluid admitted to a fixed chamber during the filling operation displacing the displaceable wall portions of the related working chamber section and thereby transferring the working liquid in said section through the intercommunication causing a corresponding displacement of the displaceable wall portions of the other section; means cooperating with a working chamber when a suitable quantity of working liquid has been displaced by the fluid flowing into one fixed chamber of the pair, and has subsequently displaced a corresponding quantity of fluid from the other fixed chamber for operating the valve means; the working liquid having substantially the same coefficient of thermal expansion as the fluid to be measured.

9. An apparatus for measuring fluids comprising a pair of fixed chambers for the fluid to be measured; a closed working liquid chamber containing a working liquid having sections operatively interposed within each of the fixed chambers and having certain walls in common with both of the fixed chambers including displaceable wall portions; the walls of the working liquid chamber not in common with the fixed chambers enclosing between them a direct intercommunication of constant volume between the sections; valve means for connecting each of the fixed chambers alternately with a supply and discharge for the fluid to be measured; the fluid admitted to a fixed chamber during the filling operation displacing the displaceable wall portions of the related working chamber section and thereby transferring the working liquid in said section through the intercommunication causing a corresponding displacement of the displaceable wall portions of the other section; means cooperating with a working chamber when a suitable quantity of working liquid has been displaced by the fluid flowing into one fixed chamber of the pair, and has subsequently displaced a corresponding quantity of fluid from the other fixed chamber for operating the valve means; the ratios between the coefficients of thermal expansion of the working liquid to the fluid to be measured being substantially equal to the ratios between the total volume of working liquid less the dead volume contained in the intercommunication, to the total volume of working liquid.

10. In a fluid meter, fixed chambers of constant volume for receiving fluid to be measured, and having outlets and inlets for said fluid; distensible chambers of variable volume containing a working fluid, one distensible chamber being arranged in each of the fixed chambers and rigidly secured to a wall thereof; connections connecting the distensible chambers in pairs; each pair of said distensible chambers forming a working fluid chamber containing an active volume of working fluid which minus the volume of the dead space formed by the connection between the two distensible chambers is less than the displaceable volume of one fixed chamber; valves controlling said inlets and outlets; means operated by the distensible chambers for controlling the valves; and means operated by the distensible chambers for indicating the amount of fluid passing through the chambers, the working fluid having substantially the same coefficient of thermal expansion as the fluid to be measured.

11. In a fluid meter, fixed chambers of constant volume for receiving fluid to be measured, and having outlets and inlets for said fluid; distensible chambers of variable volume containing a working fluid, one distensible chamber being arranged in each of the fixed chambers and rigidly secured to a wall thereof; connections connecting the distensible chambers in pairs; each pair of said distensible chambers forming a working fluid chamber containing an active volume of working fluid which minus the volume of the dead space formed by the connection between two distensible chambers is less than the displaceable volume of one fixed chamber; valves controlling said inlets and outlets; means operated by the distensible chambers for controlling the valves; and means operated by the distensible chambers for indicating the amount of fluid passing through the chambers, the ratio between the coefficients of thermal expansion of the working fluid to the fluid to be measured being substantially equal to the ratio between the total volume of working fluid less the dead volume contained in the connections, to the total volume of working fluid.

12. In a fluid meter, fixed chambers of constant volume for receiving fluid to be measured, and having outlets and inlets for said fluid; distensible chambers of variable volume containing a working fluid, one distensible chamber being arranged in each of the fixed chambers and rigidly secured to a wall thereof; connections connecting the distensible chambers in pairs; each pair of said distensible chambers forming a working fluid chamber containing an active volume of working fluid which minus the volume of the dead space formed by the connection between the two distensible chambers is less than the displaceable volume of one fixed chamber; valves controlling said inlets and outlets; means operated by the distensible chambers for controlling the valves; and means operated by the distensible chambers for indicating the amount of fluid passing through the chambers, said valve controlling means including a shaft; and temperature responsive means for varying in accordance with the temperature of the fluid to be measured the relation between the movement of the distensible chambers and the corresponding angular movement of the shaft.

13. In a fluid meter, fixed chambers of constant volume for receiving fluid to be measured, and having outlets and inlets for said fluid; distensible chambers of variable volume containing a working fluid, one distensible chamber being arranged in each of the fixed chambers and rigidly secured to a wall thereof; connections connecting the distensible chambers in pairs; each pair of said distensible chambers forming a working fluid chamber containing an active volume of working fluid which minus the volume of the dead space formed by the connection between the two distensible chambers is less than the displaceable volume of one fixed chamber; the working fluid having substantially the same coefficient of thermal expansion as the fluid to be measured; and means operated by the distensible chambers for controlling said inlets and outlets.

14. In a fluid meter, fixed chambers of constant volume for receiving fluid to be measured, and having outlets and inlets for said fluid; distensible chambers of variable volume containing a working fluid, one distensible chamber being arranged in each of the fixed chambers and rigidly secured to a wall thereof; connections connecting the distensible chambers in pairs; each pair of said distensible chambers forming a working fluid chamber containing an active volume of working fluid which minus the volume of of the dead space formed by the connection between the two distensible chambers is less than the displaceable volume of one fixed chamber; the ratio between the coefficients of thermal expansion of the working fluid to the fluid to be measured being substantially equal to the ratio between the total volume of working fluid less the dead volume contained in the connections, to the total volume of working fluid; and means operated by the distensible chambers for controlling said inlets and outlets.

15. In a fluid meter, fixed chambers of constant volume for receiving fluid to be measured, and having outlets and inlets for said fluid; distensible chambers of variable volume containing a working fluid, one distensible chamber being arranged in each of the fixed chambers and rigidly secured to a wall thereof; connections connecting the distensible chambers in pairs; each pair of said distensible chambers forming a working fluid chamber containing an active volume of working fluid which minus the volume of the dead space formed by the connection between the two distensible chambers is less than the displaceable volume of one fixed chamber; a shaft operated by the distensible members; valves operated by the shaft for controlling said inlets and outlets; and temperature responsive means for varying in accordance with the temperature of the fluid to be measured the relation between the movement of the distensible chambers and the corresponding angular movement of the shaft.

16. In a fluid meter, fixed chambers of constant volume for receiving fluid to be measured, and having outlets and inlets for said fluid; distensible chambers of variable volume containing a working fluid, one distensible chamber being arranged in each of the fixed chambers and rigidly secured to a wall thereof; connections connecting the distensible chambers in pairs; each pair of said distensible chambers forming a working fluid chamber containing an active volume of working fluid which minus the volume of the dead space formed by the connection between the two distensible chambers is less than the displaceable volume of one fixed chamber; the ratio between the coefficients of thermal expansion of the working fluid to the fluid to be measured being substantially equal to the ratio between the total volume of working fluid less the dead volume contained in the connections, to the total volume of working fluid; a shaft operated by the distensible chambers; valves operated by the shaft for controlling said inlets and outlets; and temperature responsive means for varying in accordance with the temperature of the fluid to be measured the relation between the movement of the distensible chambers and the corresponding angular movement of the shaft.

ARNE ZACHARIASSEN.
MARIUS EMIL PETERSEN.